US011925583B2

(12) United States Patent
Reynolds

(10) Patent No.: US 11,925,583 B2
(45) Date of Patent: Mar. 12, 2024

(54) RESCUE LITTER

(71) Applicant: COMBAT BOUND LLC, Virginia Beach, VA (US)

(72) Inventor: Emil Reynolds, Suffolk, VA (US)

( * ) Notice: Subject to any disclaimer, the term of this patent is extended or adjusted under 35 U.S.C. 154(b) by 168 days.

(21) Appl. No.: 17/756,406

(22) PCT Filed: Oct. 5, 2021

(86) PCT No.: PCT/US2021/071724

§ 371 (c)(1),
(2) Date: May 24, 2022

(87) PCT Pub. No.: WO2023/059354

PCT Pub. Date: Apr. 13, 2023

(65) Prior Publication Data

US 2023/0103689 A1 Apr. 6, 2023

(51) Int. Cl.

*A61G 1/01* (2006.01)
*A61G 1/02* (2006.01)
*A61G 1/044* (2006.01)
*A61G 1/048* (2006.01)

(52) U.S. Cl.

CPC ................ *A61G 1/01* (2013.01); *A61G 1/02* (2013.01); *A61G 1/044* (2013.01); *A61G 1/048* (2013.01)

(58) Field of Classification Search

CPC . A61G 1/01; A61G 1/02; A61G 1/044; A61G 1/048
USPC ................................................ 5/628, 625
See application file for complete search history.

(56) References Cited

U.S. PATENT DOCUMENTS

| | | | | |
|---|---|---|---|---|
| 3,271,796 A * | 9/1966 | Dillman | A61G 1/017 | 5/628 |
| 3,601,824 A | 8/1971 | Bradford | | |
| 3,859,677 A * | 1/1975 | Nordwig | A61G 1/00 | 5/89.1 |
| 4,944,057 A * | 7/1990 | Shaw | A61G 7/1023 | 224/159 |
| 4,979,520 A | 12/1990 | Boone, Jr. et al. | | |
| 5,317,770 A * | 6/1994 | Sakurai | A61G 7/0504 | 5/709 |
| 5,699,568 A * | 12/1997 | Couldridge | A61G 1/01 | 5/628 |

(Continued)

FOREIGN PATENT DOCUMENTS

| | | |
|---|---|---|
| GB | 2050844 A | 1/1981 |
| GB | 2157957 A | 11/1985 |

(Continued)

*Primary Examiner* — Robert G Santos
(74) *Attorney, Agent, or Firm* — Carson Patents; Gregory D Carson, Patent Attorney

(57) ABSTRACT

A rescue litter relates generally to a person, animal, and provisions carrying apparatus for purposes of human or animal recovery and relief missions. The carrying apparatus has commonalities with portable beds. The rescue litter aids manually carrying a casualty. The rescue litter comprises a stretcher sheet. The rescue litter also comprises at least one strap along the stretcher sheet to support the weight of the casualty. The stretcher sheet comprises guides to direct progressive motion of the strap(s) from a strap holder on the stretcher sheet where the strap(s) is/are held, to a head end where the strap(s) is/are free to grasp.

32 Claims, 3 Drawing Sheets

(56) References Cited

U.S. PATENT DOCUMENTS

| | | | | |
|---|---|---|---|---|
| 6,532,610 | B1 * | 3/2003 | Calfas | A61G 1/01 128/870 |
| 6,871,368 | B2 | 3/2005 | Calkin | |
| 7,516,503 | B1 | 4/2009 | Larson | |
| 8,640,288 | B2 * | 2/2014 | Jensen | A61G 1/013 5/625 |
| 8,959,682 | B2 * | 2/2015 | Jenson | A61G 1/013 5/89.1 |
| 8,991,835 | B1 | 3/2015 | Wolf et al. | |
| 9,044,364 | B2 | 6/2015 | Dominick | |
| 9,173,791 | B2 * | 11/2015 | Jensen | A61G 1/013 |
| 2008/0184488 | A1 | 8/2008 | Fee et al. | |
| 2010/0011506 | A1 * | 1/2010 | Jensen | A61G 1/013 5/628 |
| 2010/0199435 | A1 * | 8/2010 | Jensen | A61G 1/01 5/628 |
| 2014/0123393 | A1 * | 5/2014 | Jenson | A61G 1/044 5/625 |
| 2019/0380889 | A1 | 12/2019 | Paul et al. | |
| 2023/0103689 | A1 * | 4/2023 | Reynolds | A61G 1/048 5/628 |

FOREIGN PATENT DOCUMENTS

| | | | | |
|---|---|---|---|---|
| WO | WO-2004014280 | A2 * | 2/2004 | A61G 1/01 |
| WO | WO-2023059354 | A1 * | 4/2023 | A61G 1/01 |

* cited by examiner

RESCUE LITTER

FIELD OF THE INVENTION

A rescue litter relates generally to a person, animal, and provisions carrying apparatus for purposes of human or animal recovery and relief missions. The carrying apparatus has commonalities with portable beds adapted to carry incapacitated persons and animals and provisions for them.

BACKGROUND

People sometimes become incapacitated on a terrain where the ground is rough, steep, and tortuous. Transporting an incapacitated person, animal, and their provisions out of the terrain may require carrying them over the terrain.

A portable bed used as a carrying device must be transported both into the rough terrain and out of it. When being transported into the rough terrain, the portable bed should be lightweight and compact. When being used to transport an incapacitated person out of the rough terrain the portable bed must be large enough support the incapacitated person's prone body.

A litter is a portable bed devised to be carried empty into an area of rough terrain and carried out of the rough terrain with the incapacitated person on it. A prior art type of litter is a stretcher. The stretcher comprises a stretcher sheet of cloth configured to be stretched between two parallel stretcher poles.

The stretcher sheet can be wrapped around the two stretcher poles or folded between the stretcher poles to put the litter into a compact configuration. One person can transport the litter in the compact configuration into the rough terrain.

The incapacitated person can be carried on the stretcher sheet suspended between the stretcher poles. The rescue litter enables two bearers to carry one incapacitated person. Each bearer grasps an end of the two parallel bars and lifts the litter thus halving the weight each user must carry.

Both bearers must continuously grasp both stretcher poles at both ends of the stretcher to keep the stretcher sheet suspended between the stretcher poles and to prevent the incapacitated person from rolling off the stretcher.

SUMMARY OF THE INVENTION

According to a first aspect of the invention there is a rescue litter to carry a casualty, comprising stretcher poles to suspend a stretcher sheet, and a bedroll comprising the stretcher sheet, at least one strap arrayed on the stretcher sheet to support the weight of the casualty, and at least one guide to direct the strap(s) from at least one strap holder on the stretcher sheet to a head end of the stretcher sheet where the strap(s) is/are free to grasp.

According to a second aspect of the invention there is a bedroll for a rescue litter to carry a casualty, comprising: a stretcher sheet, at least one strap arrayed on the stretcher sheet to support the weight of the casualty, at least one guide to direct the strap(s) from at least one strap holder on the stretcher sheet to a head end of the stretcher sheet where the strap(s) is/are free to grasp.

According to a third aspect of the invention there is stretcher pole for a rescue litter comprising a first J shaped form capping an end of a straight pole portion, wherein the J shaped form is configured as a hand grip and a skid.

The rescue litter is convenient because the stretcher sheet, strap(s), and guides may be rolled up or folded up into package carried into a backpack, butt pack, hitched to a belt, or slung over the shoulder using the strap. The rescue litter can be carried into tight spaces and difficult terrain. The rescue litter is light weight typically less than 4 Kg or 2 Kg.

The rescue litter may be deployed by unrolling or unfolding the stretcher sheet and straps.

In the bedroll the guides may be internal to the stretcher sheet to guide the strap(s) within the stretcher sheet. The guide(s) and strap holder(s) may be on first side of the stretcher sheet and a harness to bind the casualty to the stretcher sheet may be on a second side of the stretcher sheet. So the casualty on the stretcher sheet does not rub against the strap(s) since they are internal or on the other side. The strap(s) may be slidable within the guides. The strap(s) are thus able to move progressively from the strap holder where the strap(s) may be held by the strap holder to the stretcher sheet. From there the strap(s) may move to the head end guided by the guides. This helps the strap(s) support the casualty on the stretcher sheet without tearing the stretcher sheet since the strap(s) may move relative to the stretcher sheet.

The guide(s) may attach the strap(s) to the stretcher sheet. This constrains the portion of the strap(s) intermediate the guide(s) and the strap holder(s) to with the stretcher sheet the weight of the casualty and force of pulling the rescue litter. So there is an efficient use of the strap(s) and stretcher sheet together.

The at least one strap may be two or more straps or a pair of straps.

There may be guides along center line of the sheet intermediate the edges. A strap is disposed by the guides along the center line to support the casualty head, neck, and spine directly above the strap. The guide or at least one of the guides is attached to the stretcher sheet in the middle of the head end. The straps may be arrayed as a Vee from the lateral edges edge holder to the guide in the middle of the head end. This way vital parts of the casualty are supported directly by the strap with minimal strength required by the stretcher sheet.

In the bedroll the guides may be disposed along the edges of the stretcher sheet from the strap holder to the head end. This aids two straps to share the weight of the casualty. The stretcher sheet may be suspended intermediate the two straps because the two straps are along the edges. The casualty is held up intermediate the two straps. The two straps are pulled together by pulling the straps from the head end where they are free to grasp. The casualty is gripped between the two straps which helps to prevent the casualty slipping off the stretcher sheet even without a harness.

The strap holder may be on the foot end of the stretcher sheet or proximate the foot end. This may put straps alongside the casualty from head to foot. This way the straps pull together against the length of the casualty which helps to prevent the whole casualty slipping. It also helps the straps to carry the whole weight of the casualty and distribute the casualty's weight from the head end to the foot end of the rescue litter.

The strap holder may be on the stretcher sheet midway between the head end and the foot end. This enables the strap(s) to support the weight of the casualty from their hips up to their head which is the major portion of the casualty weight. The two straps grip the casualty hips, torso, and shoulders between the two straps to prevent the casualty from slipping off the stretcher sheet.

In the bedroll the guides may be disposed on a first side of the stretcher sheet opposite to a second side to stretcher sheet intended for the casualty to rest upon. The casualty is shielded from the sharp pressure of the relatively narrow strap by the stretcher sheet. The strap is also able to move from the strap holder to the head end without rubbing against the body and being interfered with by the body.

The strap holder may be a releasable type configured to releasably attach the strap(s) to the stretcher sheet. Releasable types include a buckle, a ring, or a slot in the stretcher sheet. So the strap is easily replaced if damaged or broken. The stretcher sheet and the strap may be unattached from each other to roll or fold and to store and carry.

In the bedroll the guides may be within sleeves along the edges of the stretcher sheet from the strap holder to the head end, the sleeves to receive stretcher poles. The sleeves may be the guides. The guides may lead the straps to the sleeves. The strap hold may be at the foot end of the sheet or midway along the stretcher sheet. In this way the rescue litter may be pulled as a travois by grasping the strap(s) at the head end and much of the load will be transferred from the strap to the poles. This lessens the tearing stress on the stretcher sheet.

The rescue litter may comprise a harness across the stretcher sheet intermediate the head end and the foot end to bind the torso of the casualty to the stretcher sheet. The harness helps to prevent the casualty from rolling off the stretcher sheet. The harness also helps to prevent the casualty from slipping toward the foot end when the rescue litter is towed by grasping the strap(s) at the head end.

The harness may comprise bands connected to the stretcher sheet to bind the torso of the casualty to the stretcher sheet. The bands may be detachable from the stretcher sheet to allow the casualty to be placed directly on the stretcher sheet and then strapped on to the stretcher sheet. The harness may comprise three bands which cross each other intermediate connections of each band to edges along the stretcher sheet. A band may cross diagonally over the shoulder and hip or leg, and a band may cross straight across the belly or leg to secure the casualty to the rescue litter.

In the bedroll the harness may be connected to the stretcher sheet at edges which traverse from the foot end to the head end. The harness may detachably connect. The casualty may lie on the stretcher sheet intermediate the edges where straps are able to cross over the casualty to strap the casualty on the stretcher sheet.

In the bedroll, the harness may be connected to the guides. The straps are in or on the guides so the casualty weight on the harness or a tug on the harness is transferred to the straps. The harness may be connected to the strap(s). The straps are able to move progressively from the strap holder relative to the stretcher sheet. So the weight or tug on the harness is transferred directly to the straps and the stretcher sheet is less likely to be torn. The harness is connected to the strap connector because the strap connector may have a strong and tear resistant attachment to the stretcher sheet.

In the bedroll the stretcher sheet may narrow from the head end where the stretcher sheet is widest to the foot end where the stretcher sheet is narrowest. The stretcher sheet may be trapezoidal. The casualty shoulders are typically the widest part of their body and their feet the narrowest. So stretcher sheet narrows so that the edges hug the casualty and prevent the casualty from slipping off the stretcher sheet.

The rescue litter may comprise handles at the head end of the strap(s) to tow the rescue litter. The rescue litter may comprise a clevis at the head end of the strap(s) configured to connect the rescue litter by the strap(s) to a tow device. The clevis may connect the traps together at the head end of the straps. So the force of towing is shared by the straps to prevent the straps breaking or tearing away from the strap holder, guides, or stretcher sheet.

In the bedroll the stretcher sheet may comprise one or more inflatable compartments. The inflatable compartment(s) may extend the length of the stretcher sheet from the head end to the foot end. The inflatable compartments may be along the edges of the stretcher sheet. They may be collocated with the guides.

The rescue litter may comprise an inflator canister comprising a gas generating substance to rapidly or instantly inflate the compartment(s). The canister may be axially aligned with an edge of the stretcher sheet so that the stretcher sheet can be rolled or folded around the canister for convenient storage and transport. The canister may be axially aligned with compartment extending the length of the stretcher sheet to direct the rapidly or instantly generated gas along the longest direction the compartment to prevent a gas jet from puncturing a side wall of the compartment. In a combat zone or dangerous person zone, the rescue litter may be deployed rapidly to evacuate a casualty without staying a moment longer than necessary under fire or in a dangerous area.

An inflatable compartment may have an extent from the foot end to the head end of the stretcher sheet. The compartment may be tubular. When inflated the compartments may provide rigidity resisting bending head end toward the foot end. This makes it easier to carry the casualty prone on an upper surface of the stretcher sheet. The compartment(s) may comprise internal drop stitching connecting upper and lower surfaces of the compartment with fibers. The fibers may be directly vertical from upper to lower and/or the fibers may zig zag from upper to lower. The drop stitch provide further rigidity to the inflated compartment to resist bending and so make it easier to carry the casualty prone on the stretcher sheet.

The inflatable compartments may be disposed on a first side of the stretcher sheet opposite to a second side to stretcher sheet intended for the casualty to rest upon. So if the rescue litter is set down abruptly or dropped, the casualty is cushioned by the inflatable compartments.

The buoyancy provided by the compartments may make it possible to float a casualty across a river on the rescue litter. The casualty may be led by pulling the head of the straps. The rescue litter may also be useful for maritime rescue. Two or more rescue litters may be connected together by tying straps at the head end together or by connecting the clevises at the head end. Thus casualties can be prevented from floating away from each other and can be more easily managed by a rescuer.

To stop the casualty from sliding off the foot end of the stretcher sheet, the rescue litter may comprise a foot stop at a foot end of the stretcher sheet. The foot stop may be formed by a merger of the straps at the foot end so that no extra part may be required to provide the foot stop. The strap holder may be configured to hold the strap(s) across the foot end of the stretcher sheet so the merged straps across the foot end stop the casualty's feet from sliding off the foot end.

The foot stop may comprise a bar connected to the straps to position the bar across the foot end of the stretcher sheet. The foot stop may comprise a wheel to roll as the rescue litter is towed by pulling the straps as the head end.

The rescue litter may comprise stretcher poles along the edges of the stretcher sheet from the foot end of the stretcher sheet to the head end. The stretcher poles may comprise J shaped forms at both ends. The curved portion of the J shaped form functions as a hand grip to carry the rescue litter. The curved portion of the J shaped form also functions as a skid to drag the rescue litter. So the rescue litter may be lifted and pulled by the hand grip of the poles at the head end. The foot end may be dragged as a travois on the skid of the poles at the foot end.

The J shaped forms may be detachable from a straight portion of the pole so that the straight portion may be inserted though the sleeve in the stretcher sheet. The J shaped forms may be attachable to the straight portion by a device which restricts the J shaped forms from being pulled off an end of the straight portion. A pin though the straight portion and J shaped device would suffice. A device that requires the J shaped form to be turned to pull the J shaped form off the straight portion would be suitable. A screw thread on the straight portion end and J shaped form would be a suitable device. A slot which is axial on the straight portion or J shaped form at a specific position on the circumference the straight portion or J shaped form would be a suitable device.

The device which prevents the J shaped forms from being pulled straight off the end of the pole may also fix an angular position of a first J shaped form at a first end of the straight portion with respect to a second J shaped form at a first end of the straight portion. The angular position may be one hundred and eighty degrees of separation of the first J shaped form with respect to the second J shaped form. This way the J shaped portion may be ideally positioned at the head end of the rescue litter as a hand grip and ideally positioned at the foot end as a skid.

The invention will now be described, by way of example only, with reference to the accompanying figures in which:

DETAILED DESCRIPTION

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
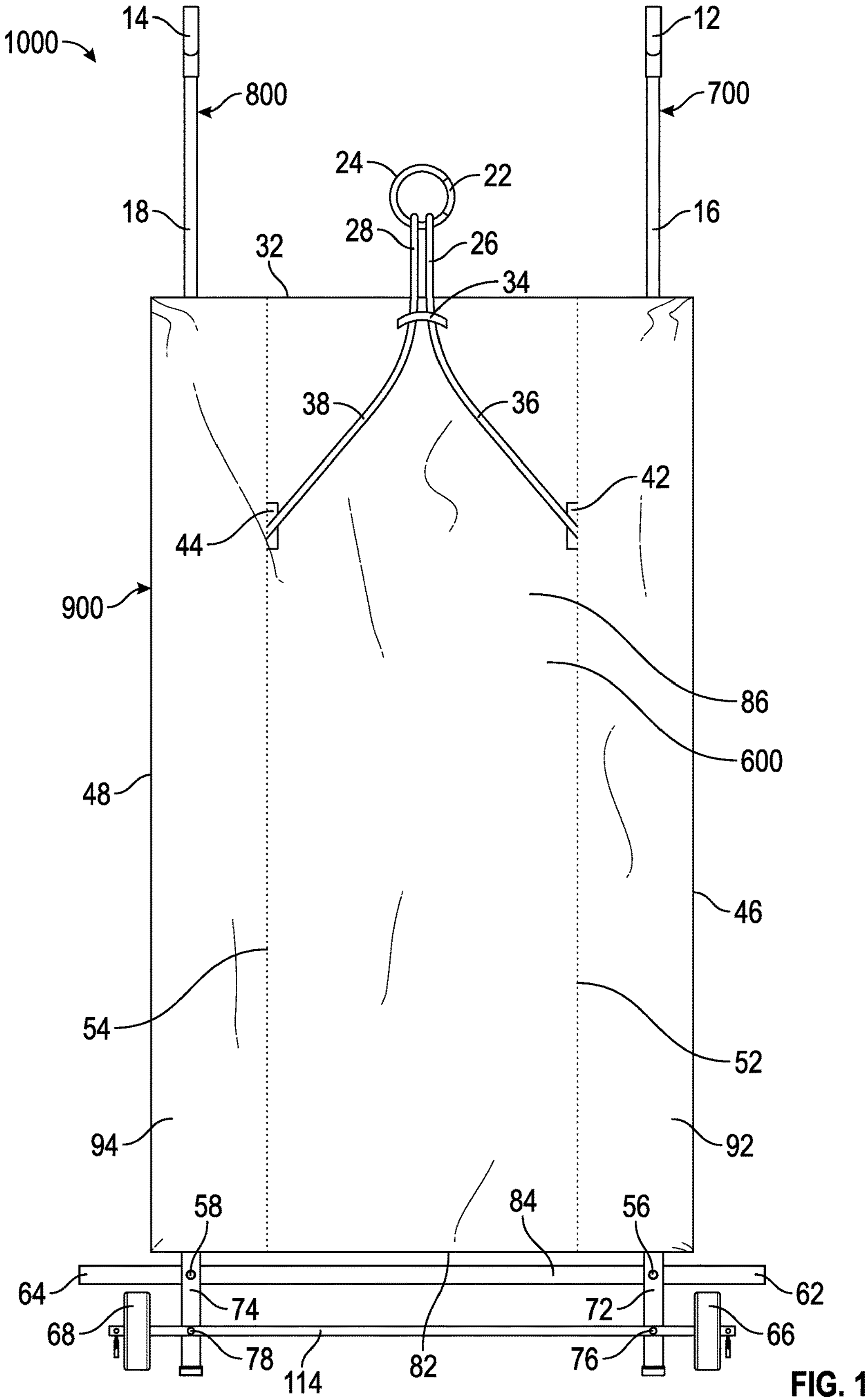
FIG. 1 illustrates the underneath of a rescue litter.
Figure 2:
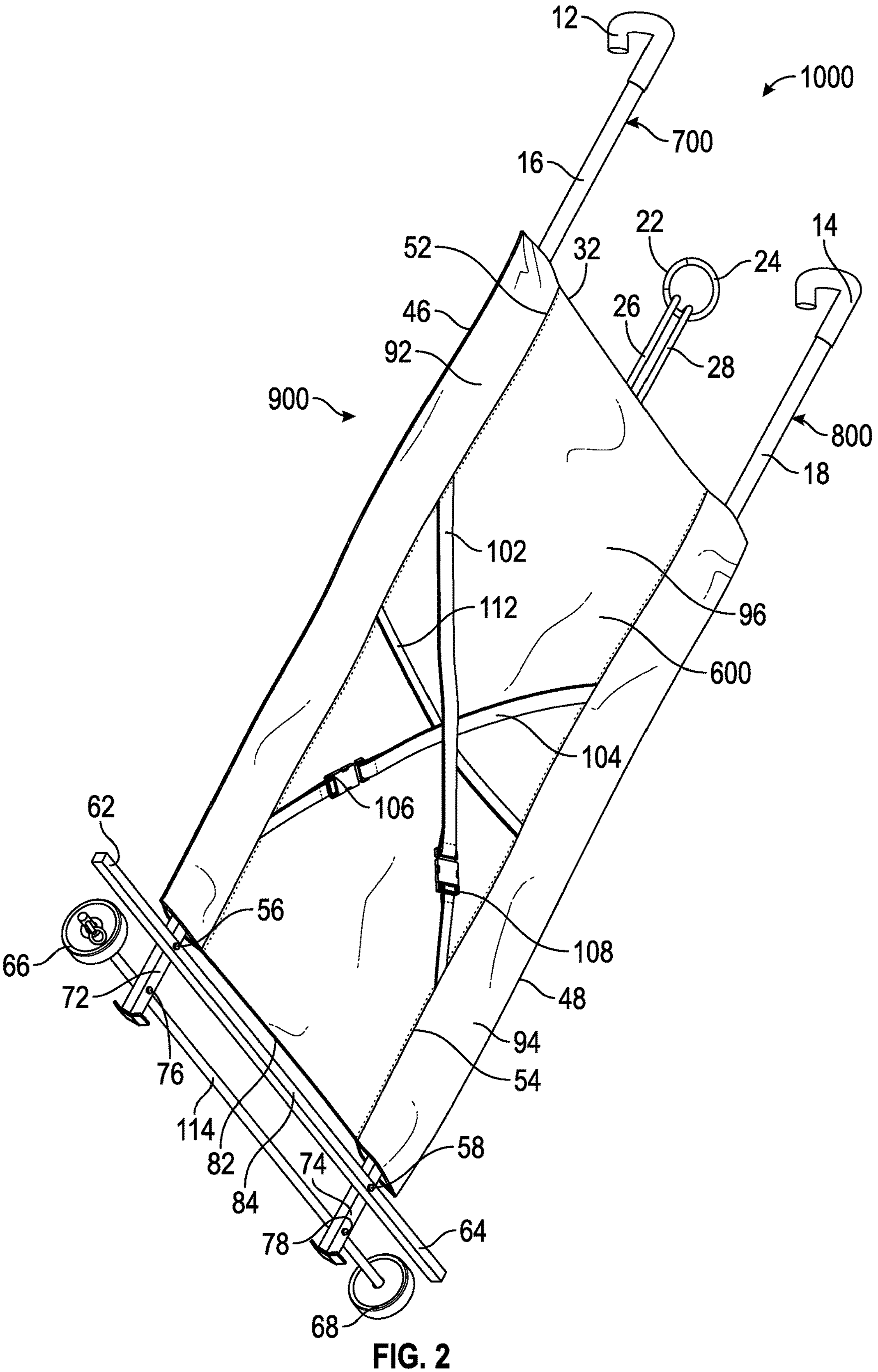
FIG. 2 illustrates the rescue litter in perspective as seen from above.
Figure 3:
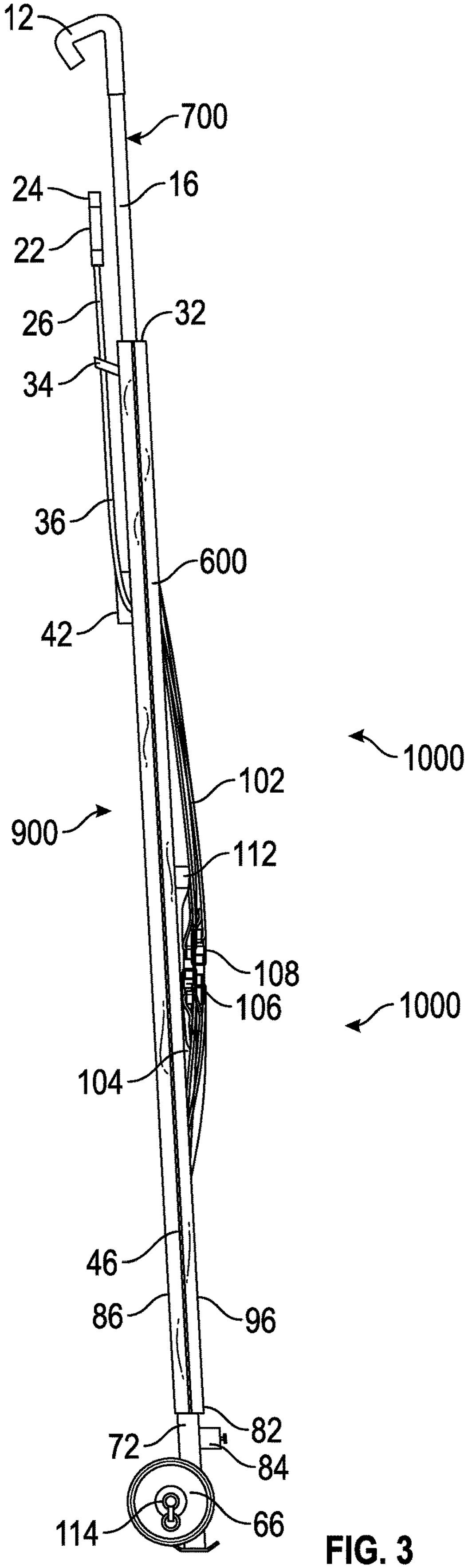
FIG. 3 illustrates an edge on view of a rescue litter.

A rescue litter 1000 is illustrated in FIGS. 1, 2, and 3. Major components of the rescue litter are a bedroll 900 and litter poles 700, 800. The bedroll 900 comprises a stretcher sheet 600 of cloth configured to be stretched between the two stretcher poles 700, 800.

The rescue litter 1000 has a first side which can be seen in FIG. 1. The rescue liter 1000 has a second side which can be seen in FIG. 2. The second side is intended for a casualty tor rest upon. In use the first side is underneath the second side.

As can be seen in FIG. 1 which shows the rescue litter 1000 from underneath, the bedroll 900 has two straps 36, 38. Strap holders 42, 44 hold an end of each strap 36, 38 to the first side 86 of the stretcher sheet 600. The straps 36, 38 are directed to a head end 32 of the stretcher sheet 600 by a guide 34. The guide 34 is attached to the first side 86 of the stretcher sheet 600. Free lengths 26, 28 of each strap 36, 38 extend off the head end 32 of the stretcher sheet 600. The straps 36, 38 are free to grasp by their free lengths 26, 28. A clevis 24 is tied to the free lengths 26, 28 to aid grasping the free lengths 26, 28.

As can be seen in FIG. 2 which illustrates the rescue litter 1000 from above, the bedroll 900 also comprises a harness of bands 102, 104, 112 which is attached to the upper side 96 of the stretcher sheet. The harness of bands 102, 104, 112 is configured to bind a casualty to the stretcher sheet 600.

Together FIG. 1 and FIG. 2 show the bedroll 900 for a rescue litter 1000 to carry a casualty, comprising: the stretcher sheet 600, the two straps 36, 38 arrayed on the stretcher sheet 600 to support the weight of the casualty. The guide 34 directs the straps 36, 38 from the strap holders 42, 44 on the stretcher sheet 600 to a head end 32 of the stretcher sheet where free lengths 26, 28 the straps 26, 38 are free to grasp.

FIG. 3 shows an edge on view of the rescue litter 1000. The stretcher pole 700 extends from the head end 32 of the stretcher sheet 600. An edge 46 of the stretcher sheet 600 is visible from the head end 32 to the foot end 82 of the stretcher sheet 600. The strap 36 is held to the stretcher sheet 600 by the strap holder 42 attached to the first side 86 of the stretcher sheet 600. The strap 36 is guided to the head end 32 by the guide 34 which is attached to the stretcher sheet 600 at the head end 32. The free length 26 of the strap 36 extends from the guide 34. The free length 26 is free to grasp 26 beyond the head end 32 of the stretcher sheet 600. The clevis 24 to pull the strap 36 is tied to the free length 26. A carabiner lever 22 on the clevis 24 opens inwards so that the clevis may be conveniently hitched.

The bands 102, 106, 112 of the harness can be seen in FIG. 3 arrayed along the second side 96 of the stretcher sheet 600. A buckle 108 for the band 102 and a buckle 106 for the band 104 can be seen. A casualty may be bound to the second side 96 of the stretcher sheet 600 and buckled into the harness of bands 102, 106, 112 using the buckles 106, 108.

Each litter pole comprises a straight pole portion 16, 18 and a J shaped portion 12, 14 capped to the head end of the straight pole portion 16 18. The J shaped portions 12, 14 are hand grips to grip the ends of the litter poles to lift the recue litter. The J shaped portions are removable from the ends of the straight pole portions so that that straight pole portions 16, 18 can be inserted through the sleeves 92, 94 which extend along the edges 46, 48 of the stretcher sheet 600 from the head end 32 to the foot end 82.

Each seam is made by folding over a lateral strip of the stretcher sheet 600 which is sewn, taped, or buttoned back to the stretcher sheet 600 along a seam 52, 54 which traverse the stretcher sheet from the head end 32 to the foot end 82. The sleeves 92, 92 have the same width and the same length and are parallel.

The straight portions of the poles have foot end extensions 72, 74 which extend out of the sleeves 92, 94 away from the foot end 82 the stretcher sheet 600. A bar makes a foot stop 84 to prevent the casualty from slipping off the foot end 82 of the stretcher sheet 60. The foot stop crosses the foot end 82 and is attached to the foot end extensions 72, 74.

Wheels 66, 68 aligned with the sleeves 92, 94 and the straight portions 16, 18 of the poles 700, 800 are attached to the ends of an axle 114. The axle 114 crosses the foot end 82 of the stretcher sheet 600 like the foot stop 84. The axle is attached to the foot end extensions 72, 74 on the first side which is the underside when the casualty is being carried. This can be seen from FIGS. 1, 2 and 3 together. This places the wheels under the stretcher sheet 600 to keep the stretcher sheet 600 off the ground. The foot stop 84 is attached to the foot end extensions on the second side so that the foot stop is above the foot end 82 of the stretcher sheet 600 when the casualty is being carried so that the foot stop 84 is in position to catch the foot of the casualty.

As shown in FIG. 1, the strap holders 42, 44 are attached the stretcher sheet 600 by the seams 52, 54 of the sleeves 92, 94 along the lateral sides. The strap holders 42, 44 are located intermediate the head end 32 and the foot end 82. The strap holders are located proximate where end of bands 102, 104 attach to the seams of the sleeves. This helps the straps to take up the weight of the casualty. This helps prevent the weight of the casualty from tearing the stretcher sheet.

As shown in FIG. 1, the guide 34 is attached to the stretcher sheet 600 in the middle of the head end 32. The straps are arrayed as a Vee from the lateral located edge holders to the guide in the middle of the head end. The straps are ideally positioned to be under the head and the shoulders of the casualty to comfortably support the weight of the upper body of the casualty. The straps are also ideally arrayed to transfer the weight of the casualty, both upper body weight and also body weight captured in harness to the free lengths 26, 28 of the straps 36, 38. So the rescue litter may be lifted and towed by the straps without discomfort to casualty or tearing the stretcher sheet 600.

The guide 34 is a component attached to the stretcher sheet, or the guide is formed by two parallel slits through the stretcher sheet 600 parallel to the head end 32. The guide 34 is configured to allow the straps 36, 38 to slide between the guide 34 and the first side 86 of the stretcher sheet 600, or the guide is configured to attach the straps 36, 38 to the stretcher sheet 600.

Allowing the straps 36 to slide between the guide 34 and the stretcher sheet 600 directs progressive motion of the strap(s) from the strap holder to the head end. At the strap holders 42, 44 the straps 36, 38 are held to the stretcher sheet and/or harness bans 102, 104. At the head end the straps slide by the guide. Thus the place where the stretcher sheet 600 is subject to tearing by the weight on the straps 36, 38 is the strap holders 42, 44 and this compensated by strong strap holders and strong attachments of the strap holders to the stretcher sheet 600 and bands 102, 104 of the harness.

Configuring the guide 34 to attach the straps 36, 38 to the head end 32 of the stretcher sheet constrains the straps 36, 38 and stretcher sheet 600 to share the force of pulling the litter and the weight of the casualty. Hence the strength of both the straps 36, 38 and the stretcher sheet 600 is combined efficiently.

The entire bedroll 900 including the stretcher sheet 600, harness of band 102, 104, 112, and the straps 36, 38 with strap holders 42, 44 are a single package. The bedroll is rolled or folded into convenient small and light weight package for transport into rough terrain. The bedroll is unrolled and unfolded to on arrival where the casualty is in distress to carry the casualty to safety.

In a preferred embodiment, there is a bedroll for a rescue litter to carry a casualty, comprising: a stretcher sheet, at least one strap arrayed on the stretcher sheet to support the weight of the casualty, at least one guide to direct the strap(s) from at least one strap holder on the stretcher sheet to a head end of the stretcher sheet where the strap(s) is/are free to grasp.

In an alternate embodiment, there is a bedroll for a rescue litter wherein the guide(s) is/are internal to the stretcher sheet to guide the strap(s) within the stretcher sheet.

In an alternate embodiment, there is a bedroll for a rescue litter wherein the strap(s) are slidable within the guide(s) to direct progressive motion of the strap(s) from the strap holder where the strap(s) is/are held (to the stretcher sheet) to the head end.

In an alternate embodiment, there is a bedroll for a rescue litter wherein the guide(s) attach the strap(s) to the stretcher sheet.

In an alternate embodiment, there is a bedroll for a rescue litter wherein the guide or at least one of the guides is attached to the head end of the stretcher sheet.

In an alternate embodiment, there is a bedroll for a rescue litter wherein the guide or at least one of the guides is attached to the stretcher sheet in the middle of the head end.

In an alternate embodiment, there is a bedroll for a rescue litter wherein the guides are disposed along the edges of the stretcher sheet from the strap holder to the head end.

In an alternate embodiment, there is a bedroll for a rescue litter wherein the guides are disposed on a first side of the stretcher sheet opposite to a second side to stretcher sheet intended for the casualty to rest upon.

In an alternate embodiment, there is a bedroll for a rescue litter wherein the strap holder releasably attaches the strap(s) to the stretcher sheet.

In an alternate embodiment, there is a bedroll for a rescue litter where the strap holders comprise edge holders at the lateral edges of the stretcher sheet.

In an alternate embodiment, there is a bedroll for a rescue litter wherein the straps are arrayed as a Vee from the lateral edges edge holder to the guide in the middle of the head end.

In an alternate embodiment, there is a bedroll for a rescue litter wherein the at least one strap comprises a pair of straps along edges of the stretcher sheet from the strap holder to the head end.

In an alternate embodiment, there is a bedroll for a rescue litter wherein the guides are within sleeves along the edges of the stretcher sheet from the strap holder to the head end, the sleeves to receive stretcher poles.

In an alternate embodiment, there is a bedroll for a rescue litter comprising a harness across the stretcher sheet intermediate the head end and a foot end to bind the torso of the casualty to the stretcher sheet.

In an alternate embodiment, there is a bedroll for a rescue litter wherein the harness comprises bands connected to the stretcher sheet to bind the torso of the casualty to the stretcher sheet.

In an alternate embodiment, there is a bedroll for a rescue litter wherein the harness comprises three bands which cross each other over the stretcher sheet.

In an alternate embodiment, there is a bedroll for a rescue litter wherein the harness is connected to the stretcher sheet at edges which traverse from the foot end to the head end.

In an alternate embodiment, there is a bedroll for a rescue litter wherein the harness is connected to the guides.

In an alternate embodiment, there is a bedroll for a rescue litter wherein the harness is connected to the strap(s).

In an alternate embodiment, there is a bedroll for a rescue litter wherein the harness is connected to the strap connector.

In an alternate embodiment, there is a bedroll for a rescue litter wherein the strap holder is attached to a foot end of the stretcher sheet opposite from the head end.

In an alternate embodiment, there is a bedroll for a rescue litter wherein the stretcher sheet narrows from the head end where the stretcher sheet is widest to the foot end where the stretcher sheet is narrowest.

In an alternate embodiment, there is a bedroll for a rescue litter wherein the stretcher sheet is trapezoidal.

In an alternate embodiment, there is a bedroll for a rescue litter comprising handles at the head end of the strap(s) to tow the rescue litter.

In an alternate embodiment, there is a bedroll for a rescue litter comprising a clevis at the head end of the strap(s) configured to connect the rescue litter by the strap(s) to a tow device.

In an alternate embodiment, there is a bedroll for a rescue litter wherein the clevis connects the straps together at the head end of the straps.

In an alternate embodiment, there is a bedroll for a rescue litter wherein the stretcher sheet comprises inflatable compartments along the edges of the stretcher sheet where are the guides.

In an alternate embodiment, there is a bedroll for a rescue litter comprising a foot stop at a foot end of the stretcher sheet to stop the casualty from sliding off the foot end of the stretcher sheet.

In an alternate embodiment, there is a bedroll for a rescue litter wherein the foot stop is formed by a merger of the straps at the foot end.

In an alternate embodiment, there is a bedroll for a rescue litter wherein the foot stop comprises the strap holder configured to hold the strap(s) across the foot end of the stretcher sheet.

In an alternate embodiment, there is a bedroll for a rescue litter wherein the foot stop comprises a bar connected to the straps to position the bar across the foot end of the stretcher sheet.

In an alternate embodiment, there is a bedroll for a rescue litter wherein the foot stop comprises a wheel to roll as the rescue litter is towed.

In an alternate embodiment, there is a bedroll for a rescue litter comprising stretcher poles along the edges of the stretcher sheet from the foot end of the stretcher sheet to the head end.

In a preferred embodiment, there is a stretcher pole for a rescue litter comprising first and second J shaped forms capping ends of a straight pole portion, wherein the J shaped forms are configured as a hand grip and a skid.

In an alternate embodiment, there is a stretcher pole for a rescue litter further comprising a detachment device which restricts the first and second J shaped forms from being pulled straight off the straight pole portion.

In an alternate embodiment, there is a stretcher pole for a rescue litter wherein the detachment device fixes the first J shaped form one hundred and eighty degrees around the straight pole portion from the second J shaped form.

In a preferred embodiment, there is a rescue litter to carry a casualty, comprising stretcher pole to suspend a stretcher sheet, and a bedroll comprising the stretcher sheet, at least one strap arrayed on the stretcher sheet to support the weight of the casualty, at least one guide to direct the strap(s) from at least one strap holder on the stretcher sheet to a head end of the stretcher sheet where the strap(s) is/are free to grasp.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

The invention claimed is:

1. A bedroll for a rescue litter to carry a casualty, comprising: a stretcher sheet, at least one strap arrayed on the stretcher sheet to support the weight of the casualty, at least one guide to direct the at lease one strap from at least one strap holder on the stretcher sheet to a head end of the stretcher sheet where the at lease one strap is free to grasp wherein the at lease one guide is within sleeves along the edges of the stretcher sheet from the at lease one strap holder to the head end, the sleeves to receive stretcher poles.

2. The bedroll according to claim 1 wherein the at lease one guide is internal to the stretcher sheet to guide the at lease one strap within the stretcher sheet.

3. The bedroll according to claim 1 wherein the at lease one strap is slidable within the at lease one guide to direct progressive motion of the at lease one strap from the at lease one strap holder where the at lease one strap held (to the stretcher sheet) to the head end.

4. The bedroll according to claim 1 wherein the at lease one guide attaches the at lease one strap to the stretcher sheet.

5. The bedroll according to claim 1 wherein the or at least one guide is attached to the head end of the stretcher sheet.

6. Bedroll according to claim 1 wherein the or at least one guide is attached to the stretcher sheet in the middle of the head end.

7. The bedroll according to claim 1 wherein the at lease one guide is disposed along the edges of the stretcher sheet from the at lease one strap holder to the head end.

8. The bedroll according claim 1 wherein the at lease one guide is disposed on a first side of the stretcher sheet opposite to a second side to stretcher sheet intended for the casualty to rest upon.

9. The bedroll according to claim 1 wherein the at lease one strap holder releasably attaches the at lease one strap to the stretcher sheet.

10. The bedroll according to claim 1 where the at lease one strap holder comprises edge holders at the lateral edges of the stretcher sheet.

11. The bedroll according to claim 10 wherein the at lease one strap is arrayed as a Vee from the lateral edges edge holders to the at lease one guide in the middle of the head end.

12. The bedroll according to claim 1 wherein the at least one strap comprises a pair of straps along edges of the stretcher sheet from the at lease one strap holder to the head end.

13. The bedroll according to claim 1 comprising a harness across the stretcher sheet intermediate the head end and a foot end to bind the torso of the casualty to the stretcher sheet.

14. The bedroll according to claim 13 wherein the harness comprises bands connected to the stretcher sheet to bind the torso of the casualty to the stretcher sheet.

15. The bedroll according to claim 13 wherein the harness comprises three bands which cross each other over the stretcher sheet.

16. The bedroll according to claim 13 wherein the harness is connected to the stretcher sheet at edges which traverse from the foot end to the head end.

17. The bedroll according to claim 13 wherein the harness is connected to the at lease one guide.

18. The bedroll according to claim 13 wherein the harness is connected to the at lease one strap.

19. The bedroll according to claim 13 wherein the harness is connected to the at lease one strap holder.

20. The bedroll according to claim 1 wherein the strap holder is attached to a foot end of the stretcher sheet opposite from the head end.

21. The bedroll according to claim 1 wherein the stretcher sheet narrows from the head end where the stretcher sheet is widest to the foot end where the stretcher sheet is narrowest.

22. The bedroll according to claim 21 wherein the stretcher sheet is trapezoidal.

23. The bedroll according to claim 1 comprising handles at the head end of the at lease one strap to tow the rescue litter.

24. The bedroll according to claim 1 comprising a clevis at the head end of the at lease one strap configured to connect the rescue litter by the at lease one strap to a tow device.

25. The bedroll according to claim 19 wherein the clevis connects the at lease one strap together at the head end of the at lease one strap.

26. The bedroll according to claim 1 wherein the stretcher sheet comprises inflatable compartments along the edges of the stretcher sheet where the at lease one guide is located.

27. The bedroll according to claim 1 comprising a foot stop at a foot end of the stretcher sheet to stop the casualty from sliding off the foot end of the stretcher sheet.

28. The bedroll according to claim 27 wherein the foot stop is formed by a merger of the at lease one strap at the foot end.

29. The bedroll according to claim 27 wherein the foot stop comprises the at lease one strap holder configured to hold the at lease one strap across the foot end of the stretcher sheet.

30. The bedroll according to claim 27 wherein the foot stop comprises a bar connected to the at lease one strap to position the bar across the foot end of the stretcher sheet.

31. The bedroll according to claim 27 wherein the foot stop comprises a wheel to roll as the rescue litter is towed.

32. The rescue litter according to claim 1 comprising stretcher poles along the edges of the stretcher sheet from the foot end of the stretcher sheet to the head end.

* * * * *